US009684578B2

(12) United States Patent
Remple et al.

(10) Patent No.: US 9,684,578 B2
(45) Date of Patent: Jun. 20, 2017

(54) EMBEDDED UNIVERSAL SERIAL BUS (USB) DEBUG (EUD) FOR MULTI-INTERFACED DEBUGGING IN ELECTRONIC SYSTEMS

(71) Applicant: QUALCOMM Incorporated, San Diego, CA (US)

(72) Inventors: Terrence Brian Remple, San Diego, CA (US); Duane Eugene Ellis, San Diego, CA (US); Sassan Shahrokhinia, San Diego, CA (US); Victor Kam Kin Wong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 14/527,873

(22) Filed: Oct. 30, 2014

(65) Prior Publication Data

US 2016/0124822 A1    May 5, 2016

(51) Int. Cl.
*G06F 11/00* (2006.01)
*G06F 11/22* (2006.01)
(Continued)

(52) U.S. Cl.
CPC .......... *G06F 11/221* (2013.01); *G06F 11/263* (2013.01); *G06F 11/267* (2013.01)

(58) Field of Classification Search
CPC ...... G06F 11/22; G06F 11/263; G06F 11/267; G06F 11/221
See application file for complete search history.

(56) References Cited

U.S. PATENT DOCUMENTS 6,732,301 B1 * 5/2004 Landry ................. G06F 11/267
710/110
6,823,224 B2   11/2004 Wood et al.
(Continued)

FOREIGN PATENT DOCUMENTS

JP    4479002 B2    6/2010

OTHER PUBLICATIONS

International Search Report and Written Opinion for PCT/US2015/053938, mailed Dec. 23, 2015, 13 pages.
(Continued)

*Primary Examiner* — Marc Duncan
*Assistant Examiner* — Jonathan Gibson
(74) *Attorney, Agent, or Firm* — Withrow & Terranova, PLLC

(57) ABSTRACT

Embedded Universal Serial Bus (USB) debug (EUD) for multi-interfaced debugging in electronic systems are disclosed. Electronic systems contain complex integrated circuits (ICs) that require extensive testing and debugging to ensure good quality and performance. In exemplary aspects, an EUD is provided in an electronic system. The EUD is configured to send control information to and/or collect debugging information from multiple internal debugging interfaces in the electronic system. The EUD is also configured to convert the debugging information into a USB format so that the debugging information can be externally accessed through a USB interface provided by the electronic system. The EUD can provide non-invasive monitoring of the electronic system. The electronic system is able to use a USB port for communications in a mission mode while EUD is enabled. Additionally, the electronic system can turn on or off all system clocks during power-saving mode while the EUD continues to function.

33 Claims, 10 Drawing Sheets

(51) Int. Cl.
  *G06F 11/263* (2006.01)
  *G06F 11/267* (2006.01)

(56) References Cited

U.S. PATENT DOCUMENTS

| | | | |
|---|---|---|---|
| 7,992,042 B2 | 8/2011 | Todoroki et al. | |
| 8,205,095 B2 | 6/2012 | Chung | |
| 8,296,469 B2* | 10/2012 | Dunstan | G06F 13/385 |
| | | | 710/105 |
| 8,487,655 B1* | 7/2013 | Kutz | H03K 19/173 |
| | | | 326/82 |
| 8,826,081 B2 | 9/2014 | Hopkins et al. | |
| 9,404,968 B1* | 8/2016 | Draper | G01R 31/3177 |
| 2010/0199077 A1* | 8/2010 | Case | G06F 11/3656 |
| | | | 713/1 |
| 2011/0307741 A1* | 12/2011 | Chen | G06F 11/3648 |
| | | | 714/38.1 |
| 2012/0036351 A1* | 2/2012 | Peet, Jr. | G06F 15/167 |
| | | | 713/150 |
| 2012/0151263 A1* | 6/2012 | Rentschler | G06F 11/22 |
| | | | 714/30 |
| 2014/0013011 A1 | 1/2014 | Hopkins | |
| 2014/0013421 A1 | 1/2014 | Hopkins et al. | |
| 2016/0356841 A1 | 12/2016 | Hopkins et al. | |

OTHER PUBLICATIONS

Stollon N., et al., "Standard Debug Interface Socket Requirements for OCP-Compliant SoC," OCP-IP Debug Working Group Whitepaper, Mar. 2007, 12 pages.

Second Written Opinion for PCT/US2015/053938, mailed Nov. 21, 2016, 8 pages.

International Preliminary Report on Patentability for PCT/US2015/053938, mailed Feb. 9, 2017, 42 pages.

* cited by examiner

EMBEDDED UNIVERSAL SERIAL BUS (USB) DEBUG (EUD) FOR MULTI-INTERFACED DEBUGGING IN ELECTRONIC SYSTEMS

BACKGROUND

I. Field of the Disclosure

The technology of the disclosure relates generally to debugging an electronic system.

II. Background

Mobile computing devices have become common in modern society. The prevalence of mobile computing devices may be attributed to the many functions that are enabled within such computing devices. Increasingly complex integrated circuits (ICs) have been designed and manufactured to provide increasingly greater functionality in mobile computing devices. In some cases, an entire system of a mobile computing device is integrated into a single IC known as a system-on-chip (SOC). In some other cases, the entire system of the mobile computing device is supported by multiple ICs that are packaged into an integrated module known as system-in-package (SIP).

ICs and mobile computing devices are repeatedly tested and debugged during different phases of their respective development life cycles in an effort to detect and eliminate potential errors before releasing the mobile computing devices to customers. While testing is a process for detecting suspected errors under specific conditions, debugging is a process used to investigate the exact causes of the suspected errors. A de facto debugging approach involves analyzing execution logs obtained under various test conditions from a device under test (DUT). In the case of debugging mobile computing devices and the ICs therein, established debugging methodologies and tools, such as joint test action group (JTAG) logging, serial wire debug (SWD), system trace, and universal asynchronous receiver/transmitter (UART) logging, are often employed. Each of these debugging methodologies is specifically designed to capture execution loggings under specific conditions from a specific circuit, component, and/or functional block in the DUT.

As the complexity of the mobile computing devices continues to increase and the size of the ICs continues to decrease, testing and debugging are becoming more cumbersome and time consuming. Accordingly, designers and developers of mobile computing devices require better testing and debugging tools.

SUMMARY OF THE DISCLOSURE

Aspects disclosed in the detailed description include embedded Universal Serial Bus (USB) debug (EUD) for multi-interfaced debugging in electronic systems. Electronic systems, such as mobile computing devices, contain complex integrated circuits (ICs) that require extensive testing and debugging to ensure good quality and performance. In exemplary aspects, an EUD is provided in an electronic system. The EUD is configured to provide control information and/or collect debugging information from multiple internal debugging interfaces (e.g., joint test action group (JTAG), serial wire debug (SWD), system trace, universal asynchronous receiver/transmitter (UART), etc.) in the electronic system. The EUD converts the debugging information into a USB format so that the debugging information can be externally accessed through a USB interface provided by the electronic system. An exemplary attribute of the EUD is that it can provide non-invasive monitoring of the electronic system. The electronic system is still able to use a USB port for communications in a mission mode while the EUD is enabled. In addition, the electronic system can still turn on or off all system clocks and transition to and from a power-saving mode, while the EUD continues to function. By providing the EUD in the electronic system to make multi-interfaced debugging information externally accessible through the USB interface, without impacting normal behavior of the electronic system, testing and debugging can be more easily and efficiently accomplished without requiring multiple connection interfaces from the electronic system.

In this regard in one aspect, an embedded EUD in an electronic system is provided. The EUD comprises a USB hub. The USB hub comprises at least one upstream interface. The at least one upstream interface is coupled to a USB PHY in the electronic system. The USB hub also comprises a plurality of downstream interfaces communicatively coupled to the at least one upstream interface. The EUD also comprises a debug peripheral coupled to one of the plurality of downstream interfaces. The debug peripheral is configured to exchange USB formatted data packets with the USB hub over the one of the plurality of downstream interfaces. The debug peripheral is communicatively coupled to at least one debug function among a plurality of debug functions in the electronic system to receive debugging information from the at least one debug function. The debug peripheral is configured to convert the debugging information received from the at least one debug function into the USB formatted data packets to be provided to the USB hub. The USB hub is configured to provide the USB formatted data packets to the USB PHY over the at least one upstream interface.

In another aspect, a method for enabling a debugging process in an electronic system using an EUD is provided. The method comprises attaching the electronic system to a USB host. The method also comprises detecting a presence of the USB host by the EUD. The method also comprises detecting if the debugging process is permitted in the electronic system by the EUD. The method also comprises receiving at least one EUD configuration from the USB host. The method also comprises receiving at least one debug command by the EUD from the USB host. The method also comprises collecting debugging information according to the at least one debug command.

In another aspect, an EUD-based test system is provided. The EUD-based test system comprises a USB host, comprising USB host interface. The EUD-based test system also comprises an electronic system. The electronic system comprises a USB PHY coupled to the USB host interface over a USB cable. The electronic system also comprises an EUD. The EUD comprises a USB hub. The USB hub comprises at least one upstream interface. The USB hub also comprises at least one first downstream interface communicatively coupled to the at least one upstream interface. The USB hub also comprises a plurality of second downstream interfaces communicatively coupled to the at least one upstream interface. The EUD also comprises at least one debug peripheral coupled to at least one of the plurality of second downstream interfaces. The EUD also comprises a disconnect switch coupled to the at least one first downstream interface. The EUD also comprises a bypass switch. The bypass switch comprises a conductive wire. The bypass switch also comprises a first bypass switch configured to alternately connect to the at least one upstream interface and the conductive wire. The bypass switch also comprises a second bypass switch configured to alternately connect to the conductive wire and the disconnect switch. The EUD also comprises an EUD power supply coupled to the USB PHY. The EUD also comprises an EUD oscillator coupled to the USB PHY. The electronic system also comprises at least one debug functions coupled to the at least one debug peripheral. The electronic system also comprises a USB controller coupled to the second bypass switch.

In another aspect, an EUD in an electronic system is provided. The EUD comprises a USB hub. The USB hub comprises at least one upstream interface. The at least one upstream interface is to be coupled to a USB PHY in the electronic system. The USB hub also comprises a plurality of downstream interfaces communicatively coupled to the at least one upstream interface. The EUD also comprises at least one debug peripheral coupled to at least one of the plurality of downstream interfaces. The at least one debug peripheral is configured to exchange USB formatted data packets with the USB hub over the at least one of the plurality of downstream interfaces. The at least one debug peripheral is communicatively coupled to at least one debug function among a plurality of debug functions in the electronic system to send control information to and/or to receive debugging information from the at least one debug function. The at least one debug peripheral is configured to convert the debugging information received from the at least one debug function into the USB formatted data packets to be provided to the USB hub. The at least one debug peripheral is configured to control the electronic system. The USB hub is configured to provide the USB formatted data packets to the USB PHY over the at least one upstream interface.

In another aspect, an EUD in an electronic system is provided. The means comprises a means for attaching the electronic system to a USB host. The means also comprises detecting a presence of the USB host by the EUD. The means also comprises detecting if the debugging process is permitted in the electronic system by the EUD. The means also comprises receiving at least one EUD configuration by the EUD from the USB host. The means also comprises receiving at least one debug command by the EUD from the USB host. The means also comprises collecting debugging information according to the at least one debug command.

DETAILED DESCRIPTION

Figure 1:
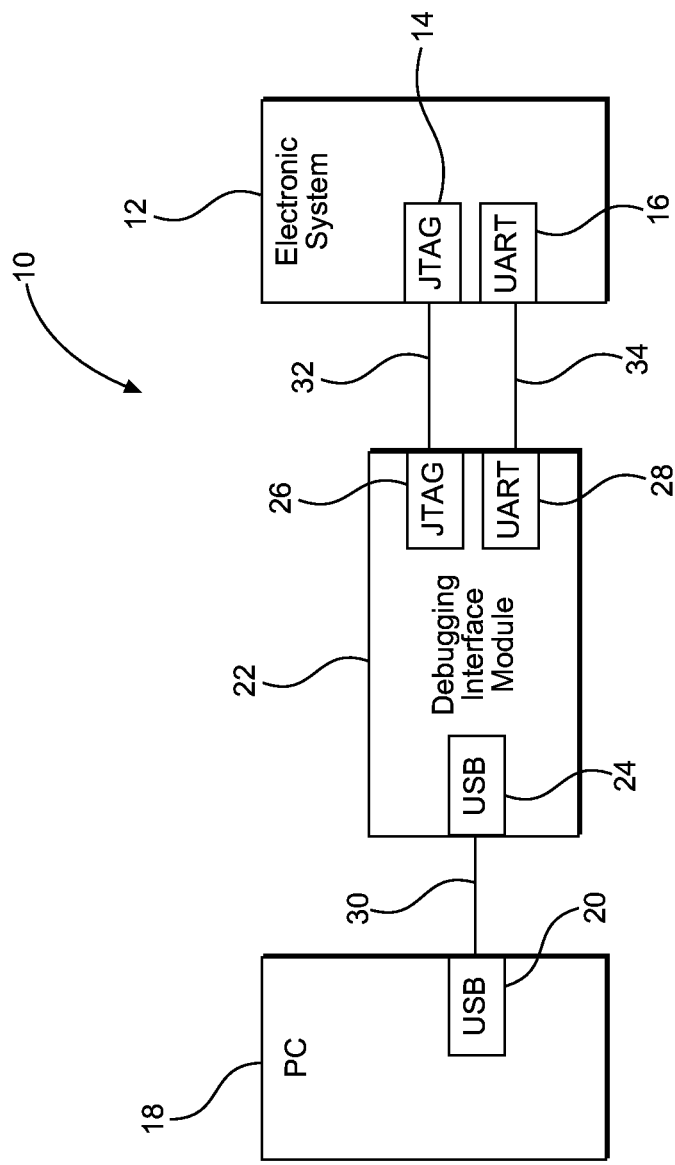
FIG. 1 is a block diagram of a conventional configuration of a debugging system for testing and debugging an electronic system that may benefit from exemplary aspects of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include embedded Universal Serial Bus (USB) debug (EUD) for multi-interfaced debugging in electronic systems. Electronic systems, such as mobile computing devices, contain complex integrated circuits (ICs) that require extensive testing and debugging to ensure good quality and performance. In exemplary aspects, an EUD is provided in an electronic system. The EUD is configured to provide control information and/or collect debugging information from multiple internal debugging interfaces (e.g., joint test action group (JTAG), serial wire debug (SWD), system trace, universal asynchronous receiver/transmitter (UART), etc.) in the electronic system. The EUD converts the debugging information into a USB format so that the debugging information can be externally accessed through a USB interface provided by the electronic system. A key attribute of the EUD is that it can provide non-invasive monitoring of the electronic system. The electronic system is still able to use a USB port for communications in a mission mode while EUD is enabled. In addition, the electronic system can still turn on or off all system clocks and transition to and from power-saving mode, while the EUD continues to function. By providing the EUD in the electronic system to make multi-interfaced debugging information externally accessible through the USB interface, without impacting normal behavior of the electronic system, testing and debugging can be more easily and efficiently accomplished without requiring multiple connection interfaces from the electronic system.

Before discussing aspects of an EUD that include specific aspects of the present disclosure, a brief overview of a conventional approach for testing and debugging an electronic system that may benefit from exemplary aspects of the present disclosure is provided with reference to FIG. 1. The discussion of specific exemplary aspects of the EUD starts below with reference to FIG. 2.

FIG. 1 is a block diagram of a conventional configuration of a debugging system 10 for testing and debugging an electronic system 12. The electronic system 12, which may be a mobile computing device for example, contains one or more ICs, among other components. Because the electronic system 12 is so complex in design and distinctive in functionality, none of the established testing and debugging tools (e.g., JTAG, SWD, system trace, UART, etc.) is capable of producing debugging information for all circuits, components, and/or functional blocks in the electronic system 12. Often times, multiple testing and debugging tools have to be used collaboratively to test all aspects of the electronic system 12 that is under testing. Because each of the testing and debugging tools relies on a respective predefined connection interface for communication, the electronic system 12 must be configured to provide a plurality of connection interfaces required by the testing and debugging tools. For example, the electronic system 12 may be configured to provide a first JTAG interface 14 and a first UART interface 16 for JTAG debugging and UART logging, respectively.

A personal computer (PC) 18, which comprises a first USB interface 20, is provided in the debugging system 10 as a control host. The debugging system 10 also includes a debugging interface module 22 (e.g., a dongle or a test board). The debugging interface module 22 comprises a second USB interface 24, a second JTAG interface 26, and a second UART interface 28. The second USB interface 24 in the debugging interface module 22 is coupled to the first USB interface 20 in the PC 18 by a USB cable 30. The second JTAG interface 26 in the debugging interface module 22 is coupled to the first JTAG interface 14 in the electronic system 12 over a standard JTAG connection cable 32. The second UART interface 28 in the debugging interface module 22 is coupled to the first UART interface 16 in the electronic system 12 over a standard UART connection cable 34. The PC 18 is configured to execute a predefined set of test procedures. The predefined set of test procedures may be executed locally on the PC 18, remotely on the electronic system 12, or interactively between the PC 18 and the electronic system 12. The debugging interface module 22 is configured to receive debugging information through the second JTAG interface 26 and the second UART interface 28 while the predefined set of test procedures is executed. The debugging interface module 22 converts the debugging information received from the second JTAG interface 26 and the second UART interface 28 into USB debugging information. The debugging interface module 22 then provides the USB debugging information to the PC 18 over the USB cable 30. The PC 18, in turn, processes the USB debugging information and presents to a variety of output media (not shown), such as a computer monitor, a printer, or a data storage medium.

Figure 2:
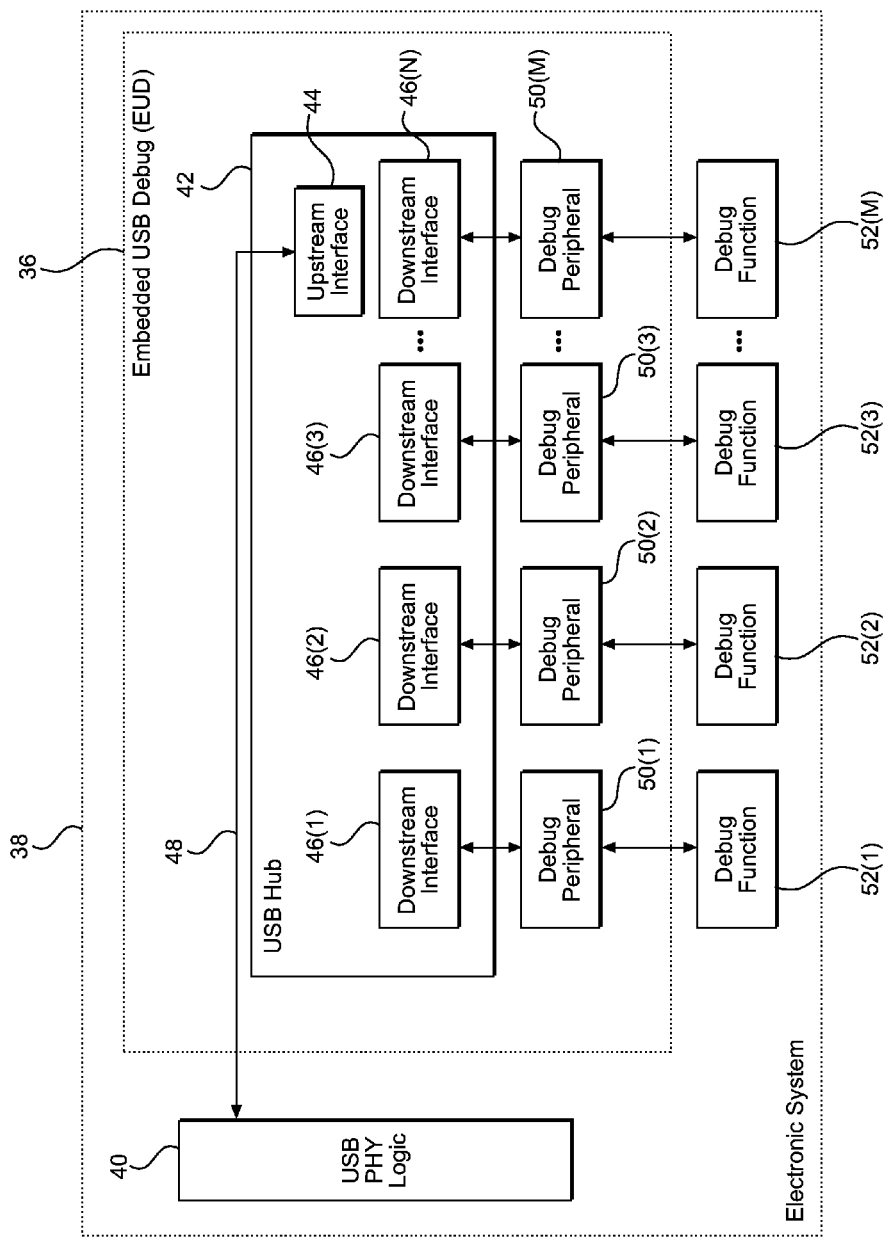
FIG. 2 is a schematic diagram of an exemplary embedded Universal Serial Bus (USB) debug (EUD) configured to send control information to or collect debugging information from at least one debug function inside an electronic system and convert the debugging information into USB formatted data packets that can be externally accessed through a USB interface.

Clearly, for the debugging system 10 to function, the electronic system 12 must be configured to provide the first JTAG interface 14, the first UART interface 16, and other connection interfaces required by respective testing and debugging tools. However, many connection interfaces required by various testing and debugging tools have been eliminated from the electronic system 12 due to design complexity, cost impact, and space constraint. As a result, testing and debugging of the electronic system 12 have become more difficult and time consuming In this regard, FIG. 2 is a schematic diagram of an exemplary EUD 36 configured to collect debugging information from at least one debug function inside an electronic system 38 and convert the debugging information into USB formatted data packets (not shown) that can be externally accessed through a USB physical layer (PHY) 40. In a non-limiting example, the USB PHY 40 is configured to provide a USB high-speed interface and/or a USB super-speed interface. The EUD 36 comprises a USB hub 42, which further comprises at least one upstream interface 44 and a plurality of downstream interfaces 46(1)-46(N). In another non-limiting example, the upstream interface 44 and the plurality of downstream interfaces 46(1)-46(N) support standard USB upstream port and downstream port functionalities, respectively. The upstream interface 44 is coupled to the USB PHY 40 over a connectivity link 48. The plurality of downstream interfaces 46(1)-46(N) is communicatively coupled to the upstream interface 44 so that the USB formatted data packets can be exchanged between the upstream interface 44 and the plurality of downstream interfaces 46(1)-46(N). The EUD 36 also comprises a plurality of debug peripherals 50(1)-50(M), wherein M is greater than or equal to one (1), communicatively coupled to the plurality of downstream interfaces 46(1)-46(N). The EUD 36 would have only one debug peripheral 50 when M equals 1. In this regard, the plurality of debug peripherals 50(1)-50(M) may also be treated as at least one debug peripheral 50. In a non-limiting example, the EUD 36 is configured to have more downstream interfaces 46(1)-46(N) than debug peripherals 50(1)-50(M), thus allowing at least one downstream interface 46 among the plurality of downstream interfaces 46(1)-46(N) to be configured for non-debugging related usage.

With continuing reference to FIG. 2, the electronic system 38 comprises a plurality of debug functions 52(1)-52(M) respectively coupled to the plurality of debug peripherals 50(1)-50(M) in the EUD 36. Each of the plurality of debug functions 52(1)-52(M) is configured to send control information to, and/or collect specific debugging information from, specific functional blocks (e.g., ICs, hardware components, and/or software functions) in the electronic system 38. In a non-limiting example, a first debug function (e.g. 52(1)) is configured to be a JTAG debug function and collect JTAG debugging information, a second debug function (e.g., 52(2)) is configured to be a SWD debug function and collect SWD debugging information, a third debug function (e.g. 52(3)) is configured to be a system trace debug function and collect system trace (e.g., Trace32) debugging information, a fourth debug function is configured to be a UART debug function and collect UART debugging information, a fifth debug function is configured to be a communication (COM) port debug function and collect COM port debugging information, and so on. Each of the plurality of debug peripherals 50(1)-50(M) receives the debugging information from a counterpart among the plurality of debug functions 52(1)-52(M). The plurality of debug peripherals 50(1)-50(M) in turn converts the debugging information into the USB formatted data packets and provides the USB formatted data packets to counterparts among the plurality of downstream interfaces 46(1)-46(N). The upstream interface 44 receives the USB formatted data packets from the plurality of downstream interfaces 46(1)-46(N) and provides the USB formatted data packets to the USB PHY 40 for external accessibility. In this regard, the USB hub 42 is configured to gather multi-interfaced debugging information from the plurality of downstream interfaces 46(1)-46(N) and provide the multi-interfaced debugging information to the USB PHY 40. By providing the EUD 36 inside the electronic systems 38, it is possible for an external host, such as the PC 18 in FIG. 1, to obtain conveniently the multi-interfaced debugging information from the electronic system 38 through the USB PHY 40. Thus, the electronic system 38 provides the USB PHY 40 to the external host, as opposed to having to support multiple connection interfaces as the electronic system 12 does in the debugging system 10 of FIG. 1.

Figure 3:
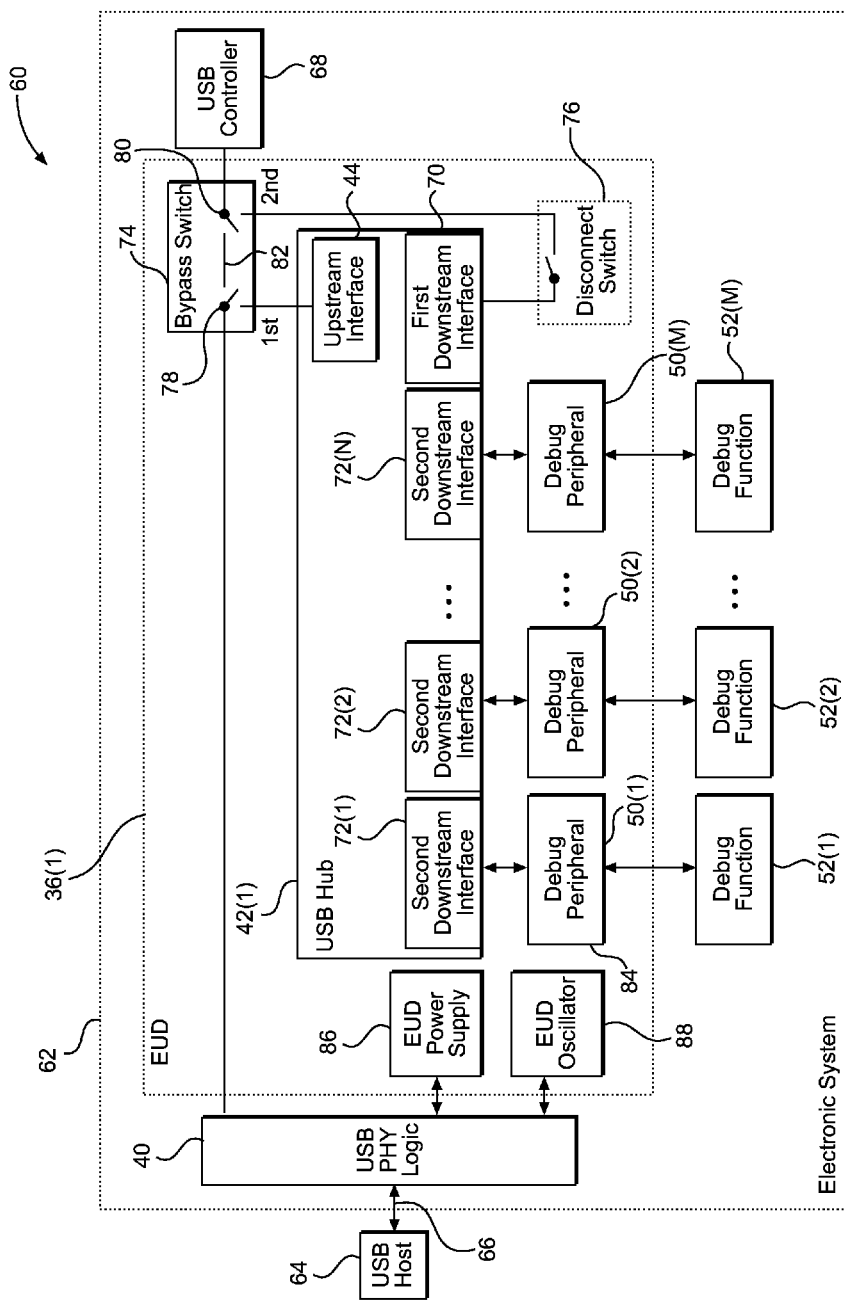
FIG. 3 is a schematic diagram of an exemplary EUD-based test system configured to send control information to or collect debugging information from multiple debug functions inside an electronic system, thus providing the multi-interfaced debugging information to a USB host according to exemplary aspects of the present disclosure.

In this regard, FIG. 3 is a schematic diagram of an exemplary EUD-based test system 60 configured to send and/or collect multi-interfaced debugging information in an electronic system 62 and provide the multi-interfaced debugging information to a USB host 64 according to exemplary aspects of the present disclosure. Common elements between FIG. 2 and FIG. 3 are shown with common element numbers, and thus will not be re-described herein. The USB host 64 is coupled to the USB PHY 40, which enables a USB interface (not shown), by a USB cable 66. Similar to the PC 18 in FIG. 1, the USB host 64 configures the EUD-based test system 60, executes the predefined set of test procedures, collects the multi-interfaced debugging information over the USB cable 66, and provides the multi-interfaced debugging information to the variety of output medias (not shown), such as a computer monitor, a printer, or a data storage medium. In a non-limiting example, the USB host 64 enables the means for connecting the electronic system 62 to the USB host 64.

The electronic system 62 comprises the USB PHY 40, an EUD 36(1), and a USB controller 68. The EUD 36(1) comprises a USB hub 42(1). In a non-limiting example, the USB PHY 40 enables the means for detecting the presence of the USB host 64 by the EUD 36(1). Accordingly, the EUD 36(1) enables the means for detecting if a debugging process is permitted in the electronic system 62, the means for receiving at least one EUD configuration from the USB host 64, the means for receiving at least one debug command from the USB host 64, and the means for collecting debugging information according to the at least one debug command. The USB hub 42(1) comprises the upstream interface 44, at least one first downstream interface 70, and a plurality of second downstream interfaces 72(1)-72(N). Note that the first downstream interface 70 and the plurality of second downstream interfaces 72(1)-72(N) are the same USB downstream interfaces, named differently only for the convenience of reference in the present disclosure. Before the EUD 36(1) is added into the electronic system 62, the USB controller 68 is directly coupled to the USB PHY 40 to provide USB connection for the electronic system 62. After the EUD 36(1) is added into the electronic system 62, either the USB hub 42(1) or the USB controller 68 can be coupled to the USB PHY 40 to provide the USB connection for the electronic system 62. As will be further discussed in FIGS. 4-6, the EUD 36(1) may be configured to operate in a debugging mode or a mission mode by changing the connectivity configurations between the USB PHY 40, the USB hub 42(1), and/or the USB controller 68. Further, it is possible to place the electronic system 62 in a power-saving mode during the debugging mode. When the electronic system 62 is placed in the power-saving mode, the electronic system 62 is said to be in a retention mode even if the EUD 36(1) remains in either the debugging mode or the mission mode.

With continuing reference to FIG. 3, to change dynamically the connectivity configurations between the USB PHY 40, the USB hub 42(1), and/or the USB controller 68, a bypass switch 74 and a disconnect switch 76 are provided in the EUD 36(1). The bypass switch 74 comprises a first bypass switch 78, a second bypass switch 80, and a conductive wire 82. In a non-limiting example, the first bypass switch 78 and the second bypass switch 80 are both three-way switches; and the disconnect switch 76 is a two-way open-close switch. In another non-limiting example, the disconnect switch 76 is provided as a software-based two-way open-close switch or a hardware-based two-way open-close switch that may be integrated with the first downstream interface 70. The first bypass switch 78 is coupled to the USB PHY 40 and configured to toggle between the upstream interface 44 in the EUD 36(1) and the conductive wire 82. When the first bypass switch 78 is connected to the upstream interface 44 in the EUD 36(1), the upstream interface 44 is then coupled to the USB PHY 40. If the first bypass switch 78 is connected to the conductive wire 82, the upstream interface 44 is then decoupled from the USB PHY 40. The disconnect switch 76 is coupled to the first downstream interface 70 in the EUD 36(1). The second bypass switch 80 is coupled to the USB controller 68 and configured to toggle between the conductive wire 82 and the disconnect switch 76. When the second bypass switch 80 is connected to the disconnect switch 76 and the disconnect switch 76 is closed, the USB controller 68 is then coupled to the first downstream interface 70 in the EUD 36(1). In contrast, if the disconnect switch 76 is open, the USB controller 68 is decoupled from the first downstream interface 70 in the EUD 36(1).

With continuing reference to FIG. 3, in a non-limiting example, at least one debug peripheral (e.g., 50(1)) among the plurality of debug peripherals 50(1)-50(M) is configured to also be a debugging control peripheral 84. The debugging control peripheral 84 is configured to enable selectively or disable selectively a debug peripheral among the plurality of debug peripherals 50(1)-50(M). The debugging control peripheral 84 is also configured to enable or disable charging for the electronic system 62 when the USB hub 42(1) detects the USB host 64. In a non-limiting example, the USB hub 42(1) detects the USB host 64 by sensing the USB host 64 or through receiving a notification from the USB host 64. The debugging control peripheral 84 is further configured to reset or power cycle the electronic system 62. In a non-limiting example, the debugging control peripheral 84 may also be configured to perform chip reset, or configure the electronic system 62 to download a new image. At least one debug peripheral (e.g., 50(2)) among the plurality of debug peripherals 50(1)-50(M) can be configured to halt or single step processors, modify registers or memory, or send messages to software processes. The EUD 36(1) also comprises an EUD power supply 86 and an EUD oscillator 88, which are both coupled to the USB PHY 40. As will be further elaborated in FIG. 4, the EUD power supply 86 and the EUD oscillator 88 are configured to provide an operating power and an operating clock, respectively, to the EUD 36(1) when the electronic system 62 is in the retention mode. To reduce power consumption, the electronic system 62 may reduce digital power supply voltages to a non-operational level when all processes in the system vote for low power. The digital power supply voltage may be reduced to a level where digital logics (not shown) in the electronic system 62 still retains respective states (e.g., retention), but are no longer able to toggle. USB software associated with the USB controller 68 may vote for the retention mode whenever the USB controller 68 is detached from the USB host 64. During the debugging mode, this may be accomplished by opening the disconnect switch 76.

Figure 4:
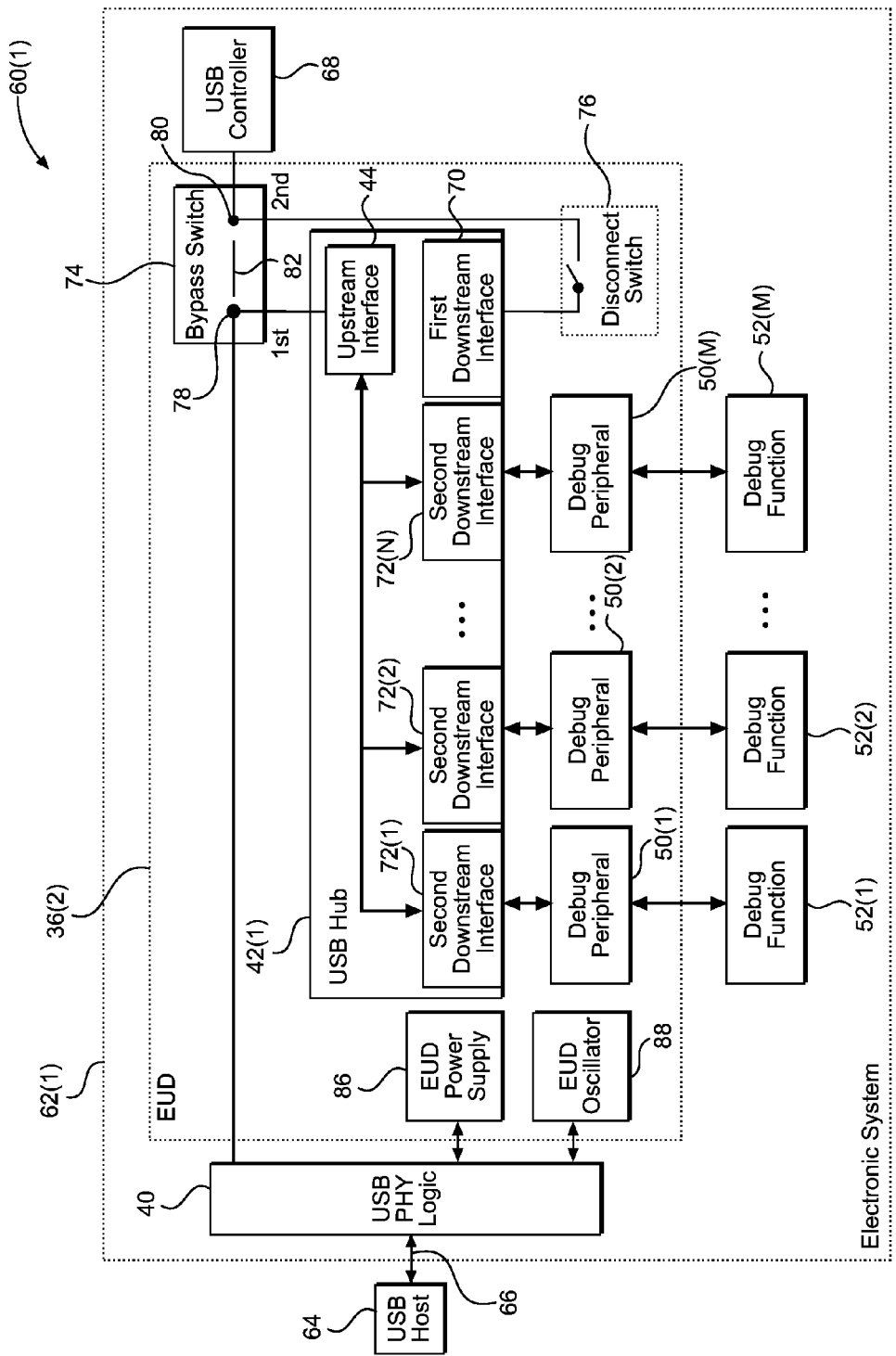
FIG. 4 is a schematic diagram of an exemplary EUD-based test system wherein an EUD is configured by virtue of a bypass switch to enable a debugging mode in an electronic system while the electronic system is detached from a USB host by virtue of a disconnect switch.

In this regard, FIG. 4 is a schematic diagram of an exemplary EUD-based test system 60(1) wherein an EUD 36(2) is configured to enable the debugging mode in an electronic system 62(1) while the electronic system 62(1) is in the retention mode. Common elements between FIG. 3 and FIG. 4 are shown with common element numbers, and thus will not be re-described herein. To enable the retention mode in the electronic system 62(1), the first bypass switch 78 is connected to the upstream interface 44, thus coupling the upstream interface 44 to the USB PHY 40. Furthermore, the second bypass switch 80 is coupled to the disconnect switch 76 and the disconnect switch 76 is open. As a result, the USB controller 68 is decoupled from the first downstream interface 70. When the USB controller 68 is decoupled from the first downstream interface 70, the USB controller 68 can no longer detect the USB host 64, thus causing the USB controller 68 to believe that the USB host 64 is detached. Consequently, the USB controller 68 informs the electronic system 62(1) that it may enter the retention mode. In the meantime, the EUD 36(2) remains coupled to the USB PHY 40 and is fully operational to collect the debugging information related to the retention mode of the electronic system 62(1) through the plurality of debug functions 52(1)-52(M). The debugging information is particularly useful to validate the electronic system 62(1) during transitions to and from the retention mode. The EUD power supply 86 and the EUD oscillator 88 are configured to provide the operating power and the operating clock, respectively, to the EUD 36(2) during the retention mode. In a non-limiting example, the EUD oscillator 88 uses a 32 kilohertz (kHz) sleep clock (not shown) in the electronic system 62(1) to generate a reference clock for the USB PHY 40 when other system clocks (not shown) in the electronic system 62(1) are turned off.

Figure 5:
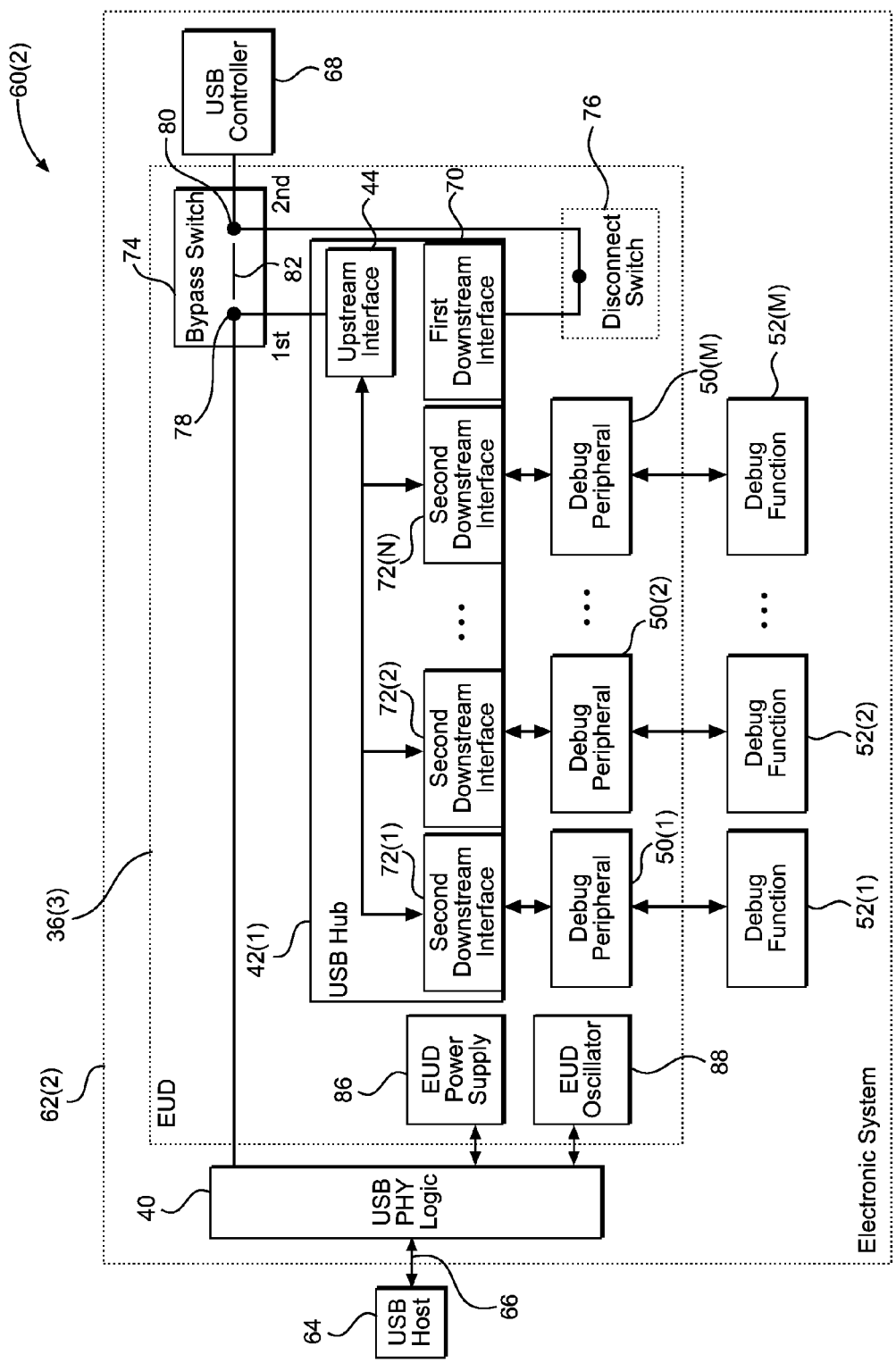
FIG. 5 is a schematic diagram of an exemplary EUD-based test system wherein an EUD is configured by virtue of a bypass switch to enable a debugging mode in an electronic system while the electronic system is attached to a USB host by virtue of a disconnect switch.

While the retention mode allows the debugging information to be obtained for one important aspect of the electronic system 62(1), it is equally important to be able to obtain the debugging information while the USB controller 68 is communicating with the USB host 64. In this regard, FIG. 5 is a schematic diagram of an exemplary EUD-based test system 60(2) wherein an EUD 36(3) is configured to enable the debugging mode in an electronic system 62(2) while the electronic system 62(2) is not in the retention mode. Common elements between FIG. 3 and FIG. 5 are shown with common element numbers and thus will not be re-described herein. In the electronic system 62(2), the first bypass switch 78 is connected to the upstream interface 44, thus coupling the upstream interface 44 to the USB PHY 40. Furthermore, the second bypass switch 80 is coupled to the disconnect switch 76 and the disconnect switch 76 is closed. As a result, the USB controller 68 is coupled to the first downstream interface 70 in the USB hub 42(1) and via the USB hub 42(1) to the USB PHY 40. The USB controller 68 is able to detect the USB host 64, thus making the USB controller 68 believe that it is attached to the USB host 64 and able to communicate with the USB host 64. In a non-limiting example, the EUD power supply 86 and the EUD oscillator 88 may be disabled during the debugging mode, and make use of a reference clock and a power supply from the electronic system 62(2). In the meantime, the EUD 36(3) remains coupled to the USB PHY 40 and fully operational to collect the debugging information related to the debugging mode through the plurality of debug functions 52(1)-52(M).

Figure 6:
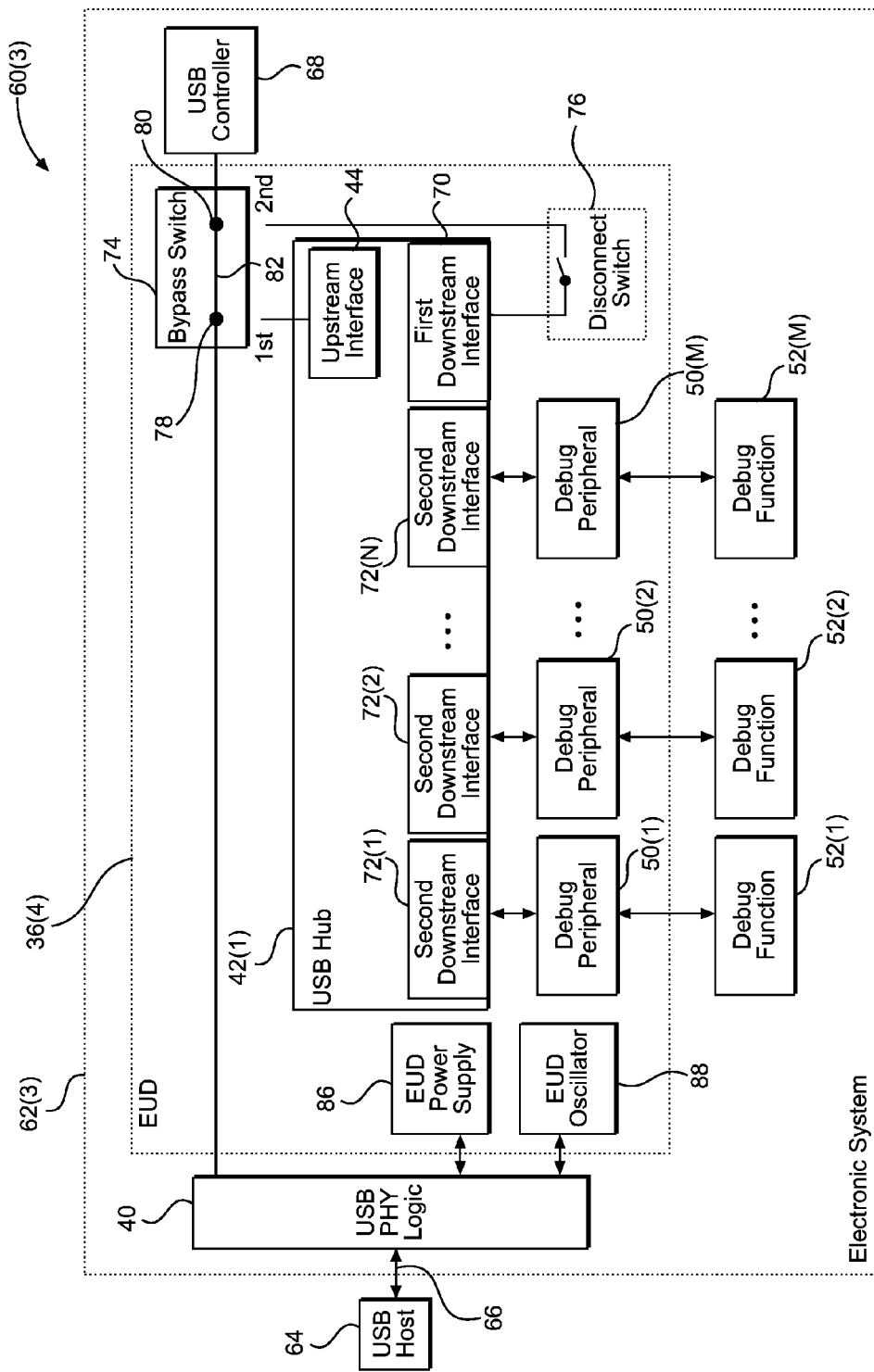
FIG. 6 is a schematic diagram of an exemplary EUD-based test system wherein an EUD is configured by virtue of a bypass switch to enable a mission mode in an electronic system.

When the electronic system 62(2) is not being debugged, it is desirable to shut down the EUD 36(3) and couple the USB controller 68 directly to the USB PHY 40 to help reduce signaling delay and power consumption in the electronic system 62(2). In this regard, FIG. 6 is a schematic diagram of an exemplary EUD-based test system 60(3) wherein an EUD 36(4) is configured to enable the mission mode in an electronic system 62(3). Common elements between FIG. 3 and FIG. 6 are shown with common element numbers, and thus will not be re-described herein. In the electronic system 62(3), the first bypass switch 78 and the second bypass switch 80 are both connected to the conductive wire 82. Under such configuration, the first bypass switch 78 and the second bypass switch 80 can also be treated as directly coupling to each other as if the conductive wire 82 does not exist. Likewise, when the first bypass switch 78 is coupled to the second bypass switch 80, or vice versa, it is equivalent to having the first bypass switch 78 and the second bypass switch 80 both coupled to the conductive wire 82. As a result, the USB controller 68 is directly coupled to the USB PHY 40 and the USB hub 42(1) is completely bypassed. Therefore, the EUD 36(4) is unable to capture the debugging information from the electronic system 62(3) in the mission mode. In this regard, the mission mode is the normal mode of operation when the electronic system 62(3) is in the hands of end users.

Figure 7:
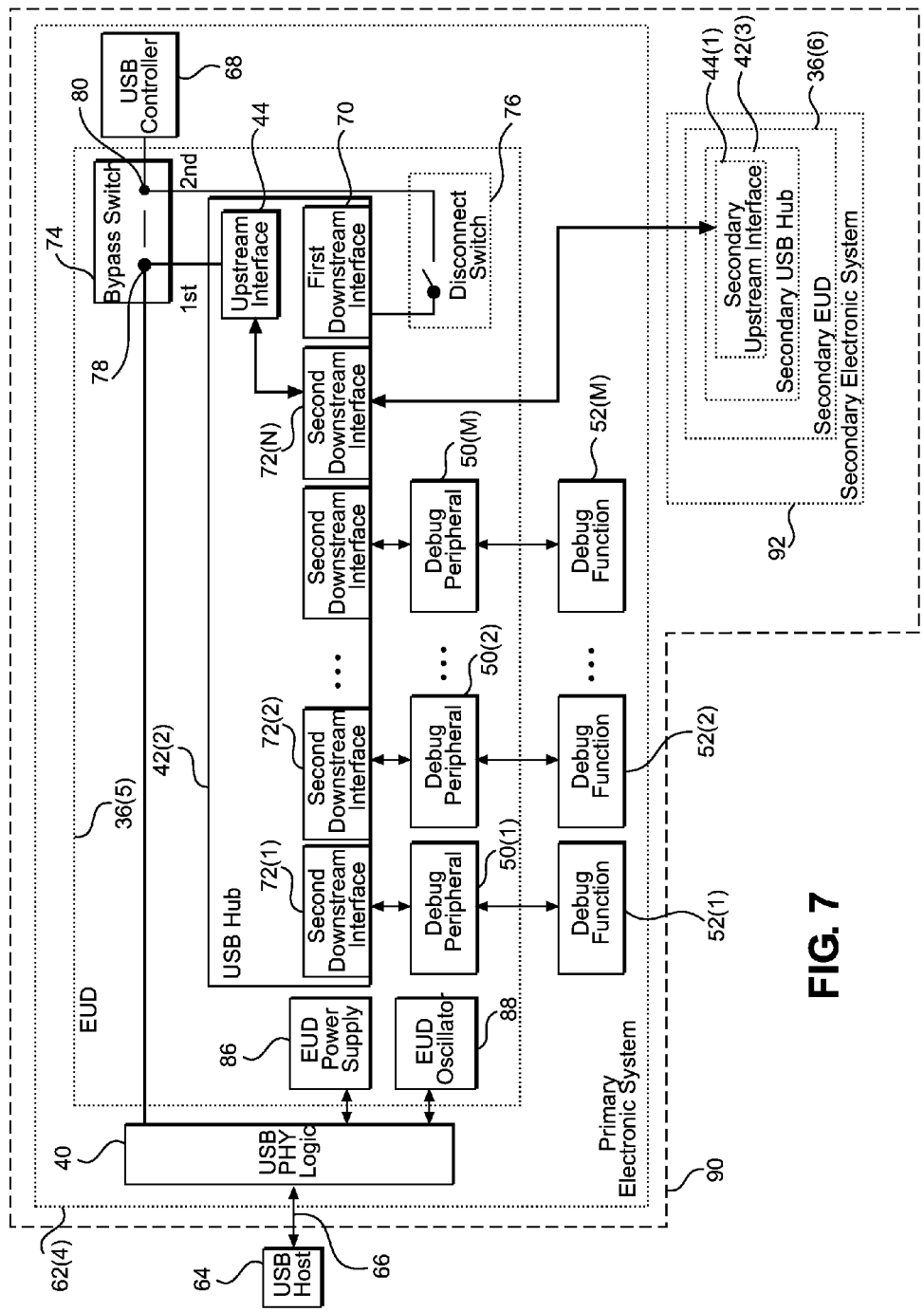
FIG. 7 is a schematic diagram of an exemplary electronic system comprising a primary electronic system and at least one secondary electronic system, wherein multi-interfaced control information and/or debugging information may be exchanged with the at least one secondary electronic system through an EUD in the primary electronic system.

Referring back to FIG. 3, in some cases, the electronic system 62 may be one of many components in a larger electronic system (e.g., a SIP-based electronic system). In this regard, FIG. 7 is a schematic diagram of an exemplary electronic system 90 comprising a primary electronic system 62(4) and at least one secondary electronic system 92, wherein the multi-interfaced debugging information may be obtained from the secondary electronic system 92 through an EUD 36(5) in the primary electronic system 62(4). Common elements between FIG. 3 and FIG. 7 are shown with common element numbers, and thus will not be re-described herein.

With reference to FIG. 7, the secondary electronic system 92 comprises a secondary EUD 36(6). The secondary EUD 36(6) comprises a secondary USB hub 42(3) and the secondary USB hub 42(3) comprises at least one secondary upstream interface 44(1). The secondary upstream interface 44(1) is communicatively coupled to a second downstream interface (e.g. 72(N)) among the plurality of second downstream interfaces 72(1)-72(N) in a USB hub 42(2) of the primary electronic system 62(4). The secondary EUD 36(6) collects the debugging information from the secondary electronic system 92, converts the multi-interfaced debugging information into the USB formatted data packets (not shown), and provides the USB formatted data packets to the USB hub 42(2) in the primary electronic system 62(4). The USB hub 42(2) in the primary electronic system 62(4) in turn makes the USB formatted data packets accessible through the USB PHY 40. While the secondary electronic system 92 is being debugged through the EUD 36(5) in the primary electronic system 62(4), the primary electronic system 62(4) may be configured to operate in the retention mode or the debugging mode as previously discussed in FIGS. 4-5.

Figure 8:
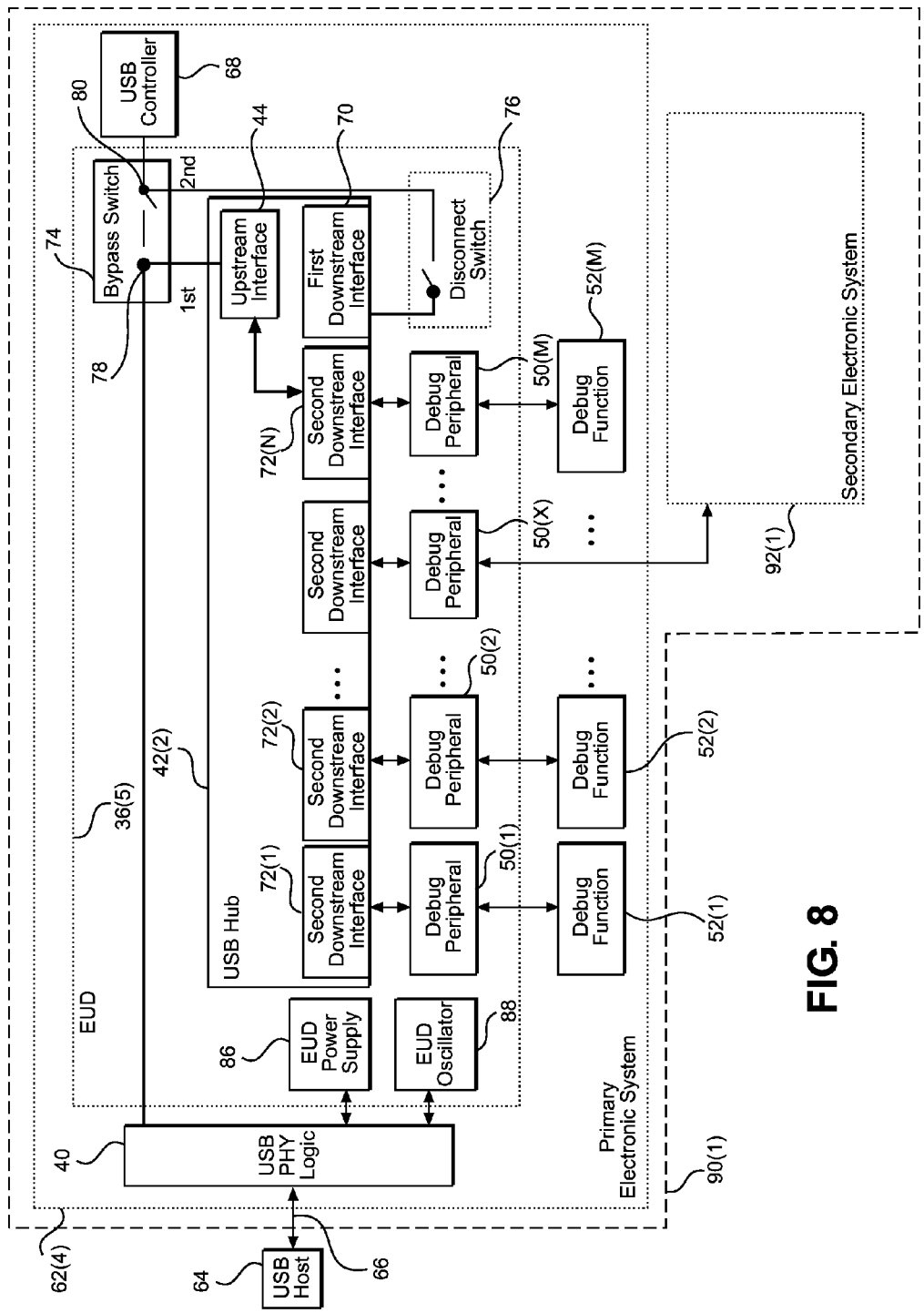
FIG. 8 is a schematic diagram of an exemplary electronic system comprising the primary electronic system of FIG. 7 and at least one secondary electronic system, wherein multi-interfaced control and/or debugging information may be exchanged with the at least one secondary electronic system through one of a plurality of debug peripherals in the primary electronic system.

In case the secondary electronic system 92 does not comprise the secondary EUD 36(6), the primary electronic system 62(4) may be configured to collect the debugging information from the secondary electronic system 92 through one of the plurality of debug peripherals 50(1)-50(M). In this regard, FIG. 8 is a schematic diagram of an exemplary electronic system 90(1) comprising the primary electronic system 62(4) of FIG. 7 and at least one secondary electronic system 92(1), wherein multi-interfaced control and/or debugging information may be exchanged with the at least one secondary electronic system 92(1) through one of the plurality of debug peripherals 50(1)-50(M) in the primary electronic system 62(4). Common elements between FIG. 7 and FIG. 8 are shown with common element numbers, and thus will not be re-described herein.

With reference to FIG. 8, a debug peripheral 50(X) (1≤X≤M) among the plurality of debug peripherals 50(1)-50(M) is configured to control the secondary electronic system 92(1) and/or collect the debugging information from the secondary electronic system 92(1). In a non-limiting example, the debug peripheral 50(X) may control the secondary electronic system 92(1) by virtue of a JTAG interface (not shown) or a SWD interface (not shown) in the secondary electronic system 92(1).

Figure 9:
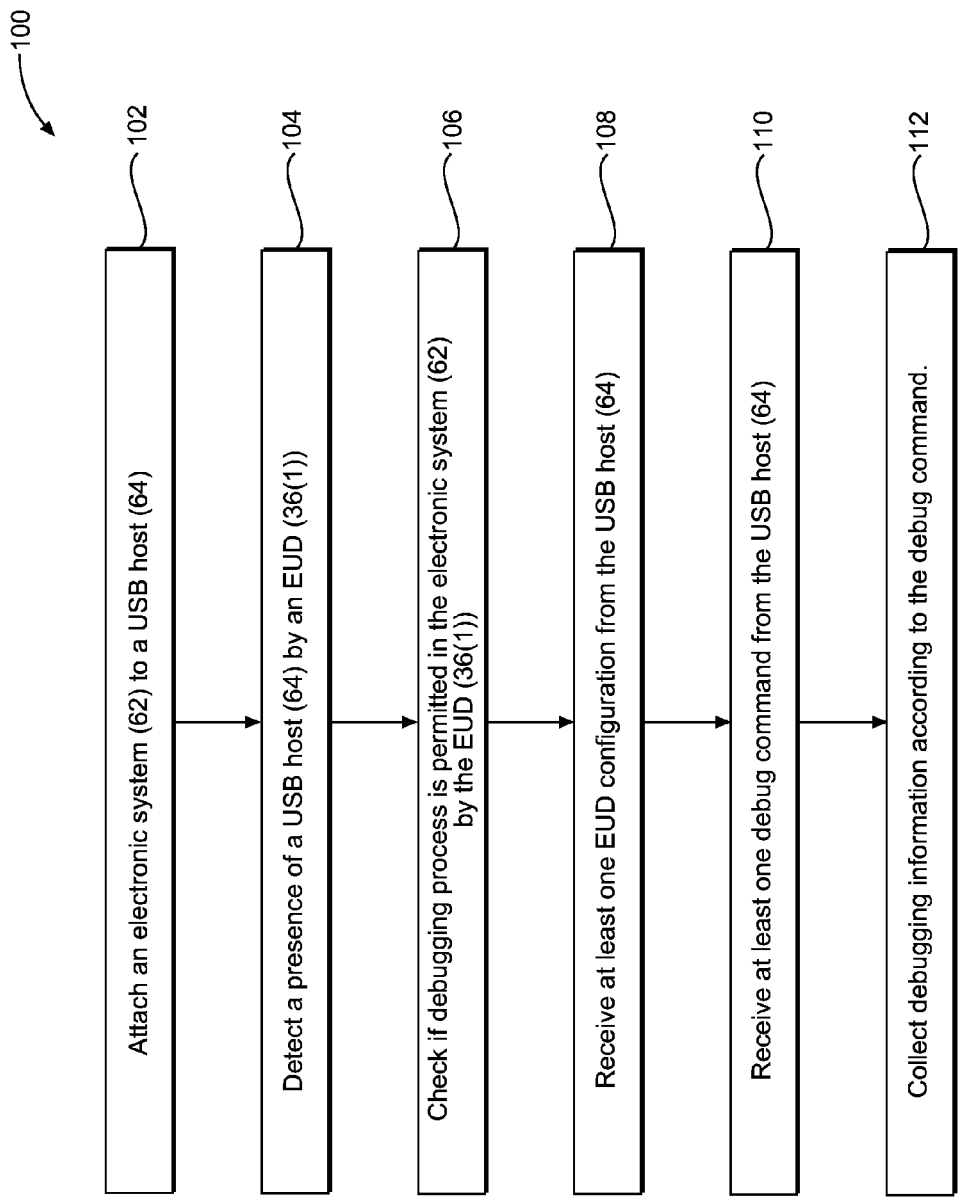
FIG. 9 is a flowchart illustrating an exemplary start-up process for enabling a debugging process in the electronic system in FIG. 3 using an EUD.

FIG. 9 is a flowchart illustrating an exemplary start-up process 100 for enabling a debugging process in the electronic system 62 in FIG. 3 using the EUD 36(1). Elements in FIG. 3 are referenced in connection to FIG. 9 and will not be re-described herein. According to the start-up process 100, the electronic system 62 is attached to the USB host 64 (block 102). Next, the EUD 36(1) detects a presence of the USB host 64 (block 104). According to discussions above, detection of the USB host 64 is an indication that the electronic system 62 has been attached to the USB host 64. Subsequently, the EUD 36(1) detects that the debugging process is permitted by the electronic system 62 (block 106). In a non-limiting example, the electronic system 62 may comprise a debug disablement fuse and the debugging process is prohibited when the debug disablement fuse is blown (e.g., in a true state). In contrast, if the debug disablement fuse is not blown (e.g., in a false state), the debugging process is permitted to proceed. Next, the EUD 36(1) receives at least one EUD configuration from the USB host 64 (block 108). Subsequently, the EUD 36(1) receives at least one debug command from the USB host 64 (block 110) and, finally, the EUD 36(1) collects debugging information according to the debug command (block 112).

EUD for multi-interfaced debugging in electronic systems according to aspects disclosed herein may be provided in or integrated into any processor-based device. Examples, without limitation, include: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 10:
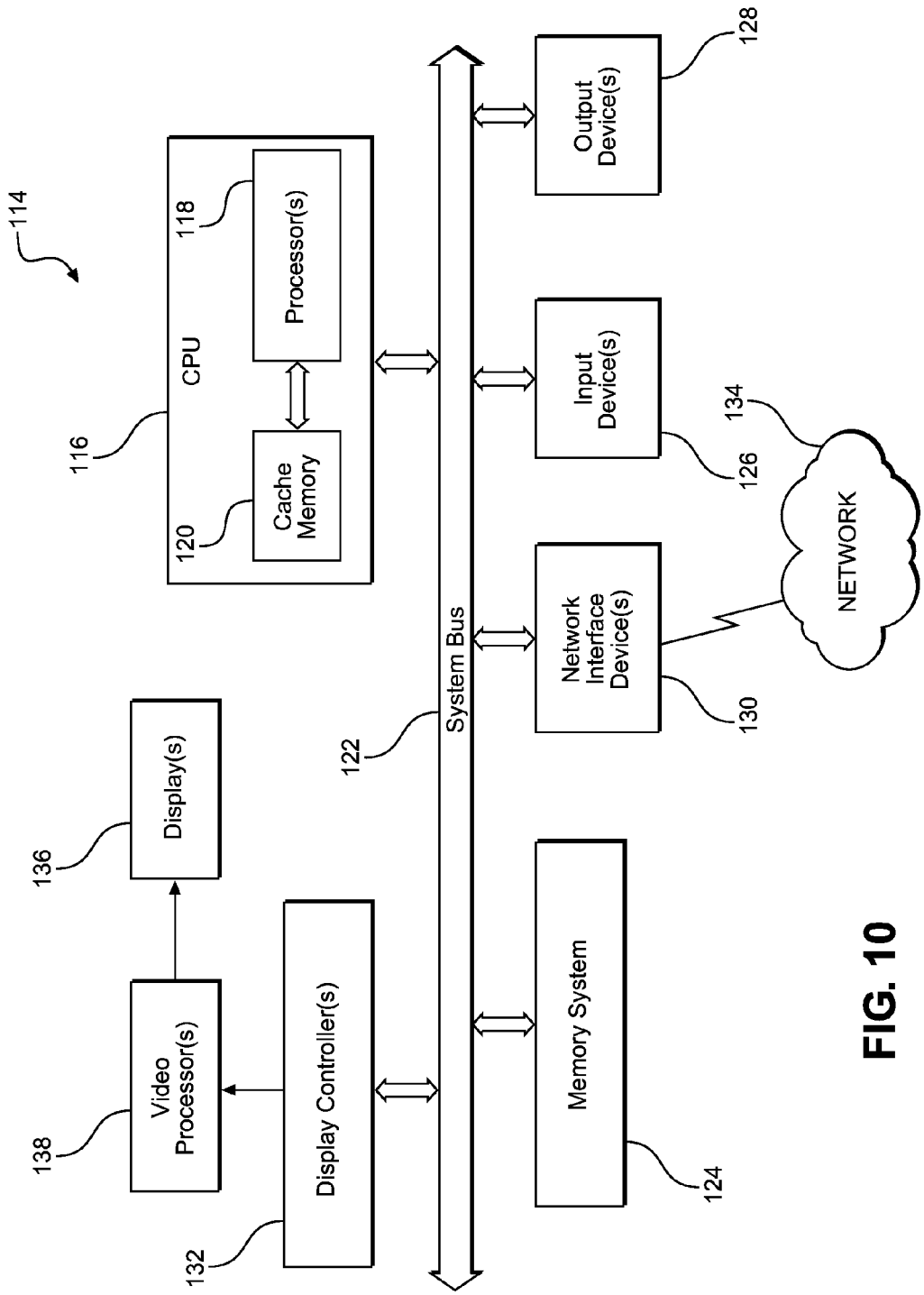
FIG. 10 is a block diagram of an exemplary processor-based system that can include the exemplary EUD of FIG. 2.

In this regard, FIG. 10 illustrates an example of a processor-based system 114 that can employ the EUDs 36, 36(1), 36(2), 36(3), 36(4) illustrated in FIGS. 2-6. In this example, the processor-based system 114 includes one or more central processing units (CPUs) 116, each including one or more processors 118. The CPU(s) 116 may have cache memory 120 coupled to the processor(s) 118 for rapid access to temporarily stored data. The CPU(s) 116 is coupled to a system bus 122 and can inter-couple devices included in the processor-based system 114. As is well known, the CPU(s) 116 communicates with these other devices by exchanging address, control, and data information over the system bus 122. Although not illustrated in FIG. 10, multiple system buses 122 could be provided, wherein each system bus 122 constitutes a different fabric.

Other devices can be connected to the system bus 122. As illustrated in FIG. 10, these devices can include a memory system 124, one or more input devices 126, one or more output devices 128, one or more network interface devices 130, and one or more display controllers 132, as examples. The input device(s) 126 can include any type of input device, including but not limited to: input keys, switches, voice processors, etc. The output device(s) 128 can include any type of output device, including but not limited to: audio, video, other visual indicators, etc. The network interface device(s) 130 can be any devices configured to allow exchange of data to and from a network 134. The network 134 can be any type of network, including but not limited to: a wired or wireless network, a private or public network, a local area network (LAN), a wireless local area network (WLAN), a wireless wide area network (WWAN), and the Internet. The network interface device(s) 130 can be configured to support any type of communications protocol desired.

The CPU(s) 116 may also be configured to access the display controller(s) 132 over the system bus 122 to control information sent to one or more displays 136. The display controller(s) 132 sends information to the display(s) 136 to be displayed via one or more video processors 138, which process the information to be displayed into a format suitable for the display(s) 136. The display(s) 136 can include any type of display, including but not limited to a cathode ray tube (CRT), a light emitting diode (LED) display, a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An embedded Universal Serial Bus (USB) debug (EUD) in an electronic system, comprising:
    a USB hub, comprising:
        at least one upstream interface coupled to a USB physical layer (PHY) in the electronic system; and
        a plurality of downstream interfaces communicatively coupled to the at least one upstream interface; and
    a multi-protocol debug peripheral coupled to one of the plurality of downstream interfaces, wherein the multi-protocol debug peripheral is configured to exchange USB formatted data packets with the USB hub over the one of the plurality of downstream interfaces;
    wherein the multi-protocol debug peripheral is communicatively coupled to at least one debug function among a plurality of debug functions configured to support a plurality of debugging protocols in the electronic system to receive debugging information based on a supported debugging protocol among the plurality of debugging protocols from the at least one debug function;
    wherein the multi-protocol debug peripheral is further configured to convert the debugging information received from the at least one debug function from the supported debugging protocol into the USB formatted data packets to be provided to the USB hub; and
    wherein the USB hub is configured to provide the USB formatted data packets to the USB PHY over the at least one upstream interface independent of whether a USB controller provided outside the EUD in the electronic system is communicating with the USB PHY.

2. The EUD of claim 1, further comprising:
    an EUD power supply coupled to the USB PHY, wherein the EUD power supply is configured to provide an operating power to the EUD; and
    an EUD oscillator coupled to the USB PHY, wherein the EUD oscillator is configured to provide an operating clock to the EUD.

3. The EUD of claim 1, further comprising an EUD power supply coupled to the USB PHY, wherein the EUD power supply is configured to provide an operating power to the EUD independent of whether digital power supply voltages in the electronic system have been set to a non-operational level.

4. The EUD of claim 1, further comprising an EUD oscillator coupled to the USB PHY, wherein the EUD oscillator is configured to provide an operating clock to the EUD independent of whether other system clocks in the electronic system are turned off.

5. The EUD of claim 1, further comprising a bypass switch configured to enable a debugging mode for the electronic system.

6. The EUD of claim 5, wherein the bypass switch comprises:
    a first bypass switch coupled to the at least one upstream interface and the USB PHY; and
    a second bypass switch coupled to the USB controller in the electronic system and one of the plurality of downstream interfaces.

7. The EUD of claim 6, further comprising a disconnect switch configured to detach the electronic system from the USB hub by keeping the disconnect switch open.

8. The EUD of claim 6, further comprising a disconnect switch configured to attach the electronic system to the USB hub by keeping the disconnect switch closed.

9. The EUD of claim 1, further comprising a bypass switch configured to enable a mission mode for the electronic system by connecting the USB PHY directly to the USB controller.

10. The EUD of claim 9, wherein the bypass switch comprises:
    a first bypass switch coupled to the USB PHY and decoupled from the at least one upstream interface; and
    a second bypass switch coupled to the USB controller in the electronic system and the first bypass switch.

11. The EUD of claim 1, wherein the multi-protocol debug peripheral is coupled to a joint test action group (JTAG) debug function in the electronic system and configured to send or receive JTAG debugging information with the respective JTAG debug function.

12. The EUD of claim 1, wherein the multi-protocol debug peripheral is coupled to a serial wire debug (SWD) debug function in the electronic system and configured to send or receive SWD debugging information with the respective SWD debug function.

13. The EUD of claim 1, wherein the multi-protocol debug peripheral is coupled to a system trace debug function in the electronic system and configured to send or receive system trace debugging information with the respective system trace debug function.

14. The EUD of claim 1, wherein the multi-protocol debug peripheral is coupled to a communication (COM) port debug function in the electronic system and configured to send or receive COM port debugging information with the respective COM port debug function.

15. The EUD of claim 1, wherein the USB PHY is a USB high-speed interface or a USB super-speed interface.

16. The EUD of claim 1, wherein the electronic system is a system-on-chip (SOC) integrated circuit (IC).

17. The EUD of claim 1, wherein the electronic system is a system-in-package (SIP) based electronic system comprising at least one secondary electronic system wherein the at least one secondary electronic system comprises a secondary EUD having at least one secondary upstream interface.

18. The EUD of claim 17, wherein one of the plurality of downstream interfaces is coupled to the at least one secondary upstream interface to send or receive the debugging information with the at least one secondary electronic system.

19. A method for enabling a debugging process in an electronic system using an embedded Universal Serial Bus (USB) debug (EUD), comprising:
   attaching the electronic system to a USB host;
   detecting a presence of the USB host by the EUD;
   detecting if the debugging process is permitted in the electronic system by the EUD;
   receiving at least one EUD configuration from the USB host;
   receiving at least one debug command by the EUD from the USB host;
   collecting debugging information based on a supported debugging protocol among a plurality of debugging protocols according to the at least one debug command;
   converting the debugging information into USB formatted data packets; and
   providing the USB formatted data packets to the USB host independent of whether a USB controller provided outside the EUD in the electronic system is communicating with the USB host.

20. The method of claim 19, wherein detecting if the debugging process is permitted in the electronic system comprises detecting a debug disablement fuse in a false state.

21. The method of claim 19, wherein connecting the electronic system to the USB host comprises connecting a USB physical layer (PHY) of the electronic system to a personal computer (PC).

22. An embedded Universal Serial Bus (USB) debug (EUD)-based test system, comprising:
   a USB host, comprising a USB host interface; and
   an electronic system, comprising:
      a USB physical layer (PHY) coupled to the USB host over a USB cable;
      an EUD, comprising:
         a USB hub, comprising:
            at least one upstream interface;
            at least one first downstream interface communicatively coupled to the at least one upstream interface; and
            a plurality of second downstream interfaces communicatively coupled to the at least one upstream interface;
         at least one multi-protocol debug peripheral coupled to at least one of the plurality of second downstream interfaces, the at least one multi-protocol debug peripheral configured to receive debugging information based on a supported debugging protocol among a plurality of debugging protocols from at least one debug function coupled to the at least one multi-protocol debug peripheral;
         a disconnect switch coupled to the at least one first downstream interface;
         a bypass switch, comprising:
            a conductive wire;
            a first bypass switch configured to alternately connect to the at least one upstream interface and the conductive wire; and
            a second bypass switch configured to alternately connect to the conductive wire and the disconnect switch;
         an EUD power supply coupled to the USB PHY; and
         an EUD oscillator coupled to the USB PHY; and
      a USB controller coupled to the second bypass switch;
      wherein the USB hub in the EUD is configured to communicate USB formatted data packets to the USB PHY over the at least one upstream interface in response to the first bypass switch being connected to the at least one upstream interface and the disconnect switch being open.

23. The EUD-based test system of claim 22, wherein the USB host is a personal computer (PC).

24. The EUD-based test system of claim 22, wherein the USB host interface is a USB high-speed interface or a USB super-speed interface.

25. The EUD-based test system of claim 22, wherein the USB PHY is a USB high-speed interface or a USB super-speed interface.

26. The EUD-based test system of claim 22, wherein the at least one multi-protocol debug peripheral is configured to be a debugging control peripheral.

27. The EUD-based test system of claim 22, wherein the disconnect switch is a software-based two-way open-close switch or a hardware-based two-way open-close switch.

28. The EUD-based test system of claim 22, wherein the disconnect switch is integrated with the at least one first downstream interface.

29. The EUD-based test system of claim 22, wherein the first bypass switch and the second bypass switch are three-way switches.

30. The EUD-based test system of claim 22, wherein the at least one first downstream interface and the plurality of second downstream interfaces are USB downstream interfaces.

31. An embedded Universal Serial Bus (USB) debug (EUD) in an electronic system, comprising:
   a USB hub, comprising:
      at least one upstream interface to be coupled to a USB physical layer (PHY) in the electronic system; and
      a plurality of downstream interfaces communicatively coupled to the at least one upstream interface; and
   at least one multi-protocol debug peripheral coupled to at least one of the plurality of downstream interfaces, wherein the at least one multi-protocol debug peripheral is configured to exchange USB formatted data packets with the USB hub over the at least one of the plurality of downstream interfaces;
   wherein the at least one multi-protocol debug peripheral is communicatively coupled to at least one debug function among a plurality of debug functions configured to support a plurality of debugging protocols in the electronic system to send control information to and/or receive debugging information based on a supported debugging protocol among the plurality of debugging protocols from the at least one debug function;
   wherein the at least one multi-protocol debug peripheral is configured to convert the debugging information received from the at least one debug function from the supported debugging protocol into the USB formatted data packets to be provided to the USB hub;

wherein the at least one multi-protocol debug peripheral is configured to control the electronic system; and wherein the USB hub is configured to provide the USB formatted data packets to the USB PHY over the at least one upstream interface independent of whether a USB controller provided outside the EUD in the electronic system is communicating with the USB PHY.

32. An embedded Universal Serial Bus (USB) debug (EUD) in an electronic system, comprising:

a means for attaching the electronic system to a USB host;

a means for detecting a presence of the USB host by the EUD;

a means for detecting if a debugging process is permitted in the electronic system by the EUD;

a means for receiving at least one EUD configuration by the EUD from the USB host;

a means for receiving at least one debug command by the EUD from the USB host; and a means for collecting debugging information configured to:

receive the debugging information based on a supported debugging protocol among a plurality of debugging protocols according to the at least one debug command;

convert the debugging information into USB formatted data packets; and provide the USB formatted data packets to the USB host independent of whether a USB controller provided outside the EUD in the electronic system is communicating with the USB host.

33. An embedded Universal Serial Bus (USB) debug (EUD) in an electronic system, comprising:

a USB hub, comprising:

at least one upstream interface coupled to a USB physical layer (PHY) in the electronic system; and a plurality of downstream interfaces communicatively coupled to the at least one upstream interface; and a debug peripheral coupled to one of the plurality of downstream interfaces, wherein the debug peripheral is configured to exchange USB formatted data packets with the USB hub over the one of the plurality of downstream interfaces;

wherein the debug peripheral is communicatively coupled to at least one debug function among a plurality of debug functions configured to support a plurality of debugging protocols in the electronic system to receive debugging information based on a supported debugging protocol selected from the group consisting of: a serial wire debug (SWD) protocol; a system trace protocol; and a communication (COM) port protocol from the at least one debug function;

wherein the debug peripheral is further configured to convert the debugging information received from the at least one debug function from the supported debugging protocol into the USB formatted data packets to be provided to the USB hub; and wherein the USB hub is configured to provide the USB formatted data packets to the USB PHY over the at least one upstream interface independent of whether a USB controller provided outside the EUD in the electronic system is communicating with the USB PHY.

* * * * *